US006775377B2

(12) United States Patent
McIllwaine et al.

(10) Patent No.: US 6,775,377 B2
(45) Date of Patent: *Aug. 10, 2004

(54) METHOD AND SYSTEM FOR DELIVERY OF INDIVIDUALIZED TRAINING TO CALL CENTER AGENTS

(75) Inventors: John C. C. McIllwaine, Alpharetta, GA (US); Matthew G. A. McConnell, Duluth, GA (US)

(73) Assignee: Knowlagent, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/198,019

(22) Filed: Jul. 18, 2002

(65) Prior Publication Data

US 2003/0048893 A1 Mar. 13, 2003

Related U.S. Application Data

(63) Continuation of application No. 09/950,528, filed on Sep. 10, 2001, now Pat. No. 6,459,787.

(51) Int. Cl.$^7$ .......................... H04M 3/00; H04M 5/00; G06F 17/60
(52) U.S. Cl. ..................................... 379/265.06; 705/11
(58) Field of Search ...................... 379/265.06, 266.01, 379/266.1, 309; 705/2–3, 11; 434/319–323

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |

(List continued on next page.)

FOREIGN PATENT DOCUMENTS

WO WO 98/22864 5/1998

OTHER PUBLICATIONS

*ACTV NET Debuts eSchool Online*; Business Wire; Mar. 24, 1997; pp. 03241287.
Armstrong, *Electronic Mail Order for Distance Learning*; IEEE Colloquium on Commercialising the Internet; pp. 4/1–4/4; Feb. 1997.
Curilem et al.; *Considerations for the Design of a Tutoring System Applied to Diabetes*; Proceedings of the 22$^{nd}$ Annual EMBX International Conference; Jul. 23–28, 2000; pp. 2811–2814.
Cybulski et al.; *Teaching Systems Analysis and Design Using Multimedia and Patterns*; IEEE; 2000; pp. 113–122.
Granić et al.; *User Interface Aspects of an Intelligent Tutoring System*; 22$^{nd}$ Int. Conf. Information Technology Interfaces ITI 2000, Jun. 13–16, 2000; pp. 157–164.

(List continued on next page.)

Primary Examiner—Benny Tieu
(74) *Attorney, Agent, or Firm*—King & Spalding, LLP (57) ABSTRACT

The tailored assignment and delivery of training or other information to an agent in a call center or other constituent contact environment. Agent interactions are recorded by a quality monitoring component of the call center to produce an agent performance record. The agent performance record is scored against predetermined performance criteria to produce an agent score. Training materials are assigned to agents based on the agent score in skill areas corresponding to the subject matter of the particular training materials. The agent score is coded and the training materials are categorized according to the associated subject matter. If an agent score is below a predetermined threshold, then a database record is populated with the agent score and a training material identifier. The database may then be polled to determine whether the agent needs the training materials to address the associated subject matter. The assigned training materials can then be delivered to the agent over the communications network.

53 Claims, 6 Drawing Sheets

U.S. PATENT DOCUMENTS

| | | | | | | |
|---|---|---|---|---|---|---|
| 4,684,349 A | 8/1987 | Ferguson et al. | | 6,086,381 A | 7/2000 | Downs et al. ............... 434/322 |
| 4,776,016 A | 10/1988 | Hansen | | 6,108,687 A | 8/2000 | Craig ......................... 709/203 |
| 4,853,952 A | 8/1989 | Jachmann et al. | | 6,118,865 A | 9/2000 | Gisby |
| 4,916,726 A | 4/1990 | Morley, Jr. et al. | | 6,118,973 A | 9/2000 | Ho et al. ..................... 434/362 |
| 5,058,008 A | 10/1991 | Schumacher | | 6,119,097 A | 9/2000 | Ibarra |
| 5,110,329 A | 5/1992 | Pieper ......................... 55/351 | | 6,128,380 A | 10/2000 | Shaffer et al. |
| 5,199,062 A | 3/1993 | Von Meister et al. | | 6,134,539 A | 10/2000 | O'Connor et al. ............ 706/45 |
| 5,309,505 A | 5/1994 | Szlam et al. | | 6,141,528 A | 10/2000 | Remschel .................... 434/350 |
| 5,310,349 A | 5/1994 | Daniels et al. | | 6,144,971 A | 11/2000 | Sunderman et al. |
| 5,311,422 A | 5/1994 | Loftin et al. | | 6,146,148 A | 11/2000 | Stuppy ....................... 434/322 |
| 5,384,841 A | 1/1995 | Adams et al. | | 6,149,441 A | 11/2000 | Pellegrino et al. .......... 434/350 |
| 5,416,694 A | 5/1995 | Parrish et al. | | 6,155,840 A | 12/2000 | Sallette ....................... 434/323 |
| 5,469,491 A | 11/1995 | Morley et al. | | 6,163,607 A | 12/2000 | Bogart et al. .......... 379/266.01 |
| 5,511,112 A | 4/1996 | Szlam | | 6,170,014 B1 | 1/2001 | Darago et al. |
| 5,533,115 A | 7/1996 | Hollenbach et al. | | 6,171,109 B1 | 1/2001 | Ohsuga |
| 5,535,256 A | 7/1996 | Maloney et al. | | 6,192,122 B1 | 2/2001 | Flockhart et al. ....... 379/266.01 |
| 5,583,965 A | 12/1996 | Douma et al. | | 6,201,948 B1 | 3/2001 | Cook et al. ................. 434/350 |
| 5,590,188 A | 12/1996 | Crockett ................ 379/265.02 | | 6,211,451 B1 | 4/2001 | Tohgi et al. ............... 84/470 R |
| 5,594,791 A | 1/1997 | Szlam et al. | | 6,215,865 B1 | 4/2001 | McCalmont |
| 5,597,312 A | 1/1997 | Bloom et al. | | 6,263,049 B1 | 7/2001 | Kuhn |
| 5,633,924 A | 5/1997 | Kaish et al. | | 6,275,812 B1 | 8/2001 | Haq et al. |
| 5,659,768 A | 8/1997 | Forbes et al. | | 6,278,978 B1 | 8/2001 | Andre et al. |
| 5,675,637 A | 10/1997 | Szlam et al. | | 6,289,340 B1 | 9/2001 | Puram et al. ................... 707/5 |
| 5,696,811 A | 12/1997 | Maloney et al. | | 6,324,282 B1 | 11/2001 | McIllwaine et al. |
| 5,703,943 A | 12/1997 | Otto | | 6,347,139 B1 | 2/2002 | Fisher et al. ........... 379/265.12 |
| 5,721,770 A | 2/1998 | Kohler | | 6,371,765 B1 | 4/2002 | Wall et al. .................. 434/224 |
| 5,727,950 A | 3/1998 | Cook et al. | | 6,408,066 B1 | 6/2002 | Andruska et al. ....... 379/265.12 |
| 5,738,527 A | 4/1998 | Lundberg | | 6,453,038 B1 | 9/2002 | McFarlane et al. .... 379/265.05 |
| 5,745,109 A | 4/1998 | Nakano et al. | | 6,459,787 B2 | 10/2002 | McIllwaine et al. |
| 5,757,644 A | 5/1998 | Jorgensen et al. | | 6,510,221 B1 | 1/2003 | Fisher et al. ........... 379/265.12 |
| 5,790,798 A | 8/1998 | Beckett et al. | | 6,535,600 B1 | 3/2003 | Fisher et al. ........... 379/265.12 |
| 5,818,907 A | 10/1998 | Maloney et al. | | 6,553,114 B1 | 4/2003 | Fisher et al. ........... 379/265.12 |
| 5,825,869 A | 10/1998 | Brooks et al. | | 6,559,867 B1 | 5/2003 | Kotick et al. ............... 345/771 |
| 5,827,071 A | 10/1998 | Sorensen et al. | | 2003/0033184 A1 | 2/2003 | Benbassat et al. |
| 5,833,468 A | 11/1998 | Guy et al. | | | | |
| 5,861,881 A | 1/1999 | Freeman et al. | | | | |
| 5,877,954 A | 3/1999 | Klimasauskas et al. | | | | |
| 5,903,641 A | 5/1999 | Tonisson | | | | |
| 5,904,485 A | 5/1999 | Siefert ........................ 434/322 | | | | |
| 5,911,134 A | 6/1999 | Castonguay et al. | | | | |
| 5,915,973 A | 6/1999 | Hoehn-Saric et al. ....... 434/350 | | | | |
| 5,937,037 A | 8/1999 | Kamel et al. | | | | |
| 5,943,416 A | 8/1999 | Gisby | | | | |
| 5,946,375 A | 8/1999 | Pattison et al. | | | | |
| 5,946,387 A | 8/1999 | Miloslavsky | | | | |
| 5,947,747 A | 9/1999 | Walker et al. ............... 434/354 | | | | |
| 5,957,659 A | 9/1999 | Amou et al. ................. 415/178 | | | | |
| 5,963,635 A | 10/1999 | Szlam et al. | | | | |
| 5,971,271 A | 10/1999 | Wynn et al. | | | | |
| 5,991,394 A | 11/1999 | Dezonno et al. | | | | |
| 6,014,134 A | 1/2000 | Bell et al. | | | | |
| 6,038,544 A | 3/2000 | Machin et al. | | | | |
| 6,039,575 A | 3/2000 | L'Allier et al. ............. 434/323 | | | | |
| 6,044,355 A | 3/2000 | Crockett et al. | | | | |
| 6,044,368 A | 3/2000 | Powers | | | | |
| 6,052,460 A | 4/2000 | Fisher et al. | | | | |
| 6,058,163 A | 5/2000 | Pattison et al. | | | | |
| 6,067,537 A | 5/2000 | O'Connor et al. ............ 706/47 | | | | |
| 6,067,538 A | 5/2000 | Zorba et al. ................... 706/47 | | | | |
| 6,070,142 A | 5/2000 | McDonough et al. .......... 705/7 | | | | |
| 6,073,127 A | 6/2000 | Lannert et al. ............... 706/45 | | | | |
| 6,078,894 A | 6/2000 | Clawson et al. .............. 705/11 | | | | |

OTHER PUBLICATIONS

Syntora.com; *Syntora Agentivity*; (2003); 14 Pages.

Call Center E-Journal; *Telvista Integrates eLearning and Quality Monitoring*; Aug. 2001; pp. 8–12.

Click2learn; *Click2learn Unveils New Platform; Takes Aim at e-Learning Industry's Shortcomings*; Press Release; Jun. 4, 2001.

Click2learn; *Aspen: The Next-Generation e-Learning Platform*; (2001).

Envision Telephony; *Click2Coach*; (2001).

Envision Telephony; *What Makes Your Contact Center Agents Truly Effective*; (2001).

Fletcher, Scotty; *Companies turn to the Virtual Classroom*; dbusiness.com; May 25, 2000.

NICE Systems; *NICE to Launch Integrated e-Learning Solution Through Partnership With Astound*; News Release; Dec. 4, 2000.

Skowronek, Larry; *Aspect eWorkforce Management v6*; Jul. 30, 2001.

Levinson et al.; *Chess Neighborhoods, Function Combination, and Reinforcement Learning*; Institution of Electrical Engineers; 2003; INSPEC Abstract No. C2002-07-7830D-012.

| | RK | JB | RC | GS | MJ | DS | KT | BB |
|---|---|---|---|---|---|---|---|---|
| A | | | 50 | | | 55 | | |
| B | | | | | | | | |
| C | 65 | | 55 | | | | | |
| D | | | 65 | 60 | | | 60 | 65 |
| E | | 60 | | | | | | |
| F | | 50 | | | | | | |
| G | | | | | | 65 | | |
| H | | | 65 | | | | | |
| I | 50 | 55 | | | | | 45 | |
| J | | | | 65 | | | | 55 |
| K | | | | | | | 60 | |

Columns: AGENT
Rows: TRAINING CONTENT CODE

METHOD AND SYSTEM FOR DELIVERY OF INDIVIDUALIZED TRAINING TO CALL CENTER AGENTS

RELATED-APPLICATION

The present application is a continuation of and claims priority to U.S. application entitled Method and System for Delivery of Individualized Training to Call Center Agents, filed Sep. 10, 2001, having Ser. No. 09/950,528 now U.S. Pat. No. 6,459,787, which is a continuation of U.S. Pat. No. 6,324,282, filed Mar. 2, 2000, entitled Method and System for Delivery of Individualized Training to Call Center Agents.

FIELD OF THE INVENTION

The present invention relates generally to call centers for managing customer communications and, more specifically, to assigning tailored content, such as training materials, to agents based on recorded agent performance.

BACKGROUND OF THE INVENTION

A call center is a system that enables a staff of call center agents to service telephone calls to or from the customers or other constituents of an organization. Typically, calls are distributed and connected to agents that are available at the time of the call or are otherwise most suited to handle the call. The call-distribution function, commonly referred to as automatic call distribution ("ACD"), is generally implemented in software that executes in a switching system, such as a private branch exchange, that connects customer calls to agent telephones. A workforce management ("WFM") component is often employed by a call center to schedule and manage agent staffing and call center capacity.

More recently, computer-telephony integration ("CTI") has been widely employed in call centers. In a typical call center, a CTI component conveys telephony information, such as the telephone number of the calling party and the identity of the agent to whom the call is connected, from the ACD switching system to other components of the call center system. The other components of the call center system typically use this information to send relevant database information, such as the account file of the calling party, across a local area network ("LAN") or other communications network to a data terminal of the agent to whom the call is connected. The CTI component, other system components, and the LAN can also be used to deliver other information to the agents.

More generally, the business function provided by a call center may be extended to other communications media and to contact with constituents of an organization other than customers. For example, an e-mail help desk may be employed by an organization to provide technical support to its employees. Web-based "chat"-type systems may be employed to provide information to sales prospects. When a broadband communications infrastructure is more widely deployed, systems for the delivery of broadband information, such as video information, to a broad range of constituents through constituent contact centers will likely be employed by many organizations.

Agents in call centers and other constituent contact centers must be well-trained in order to maximize their productivity and effectiveness. Agent training must be intensive and frequent in centers that handle complex interactions with constituents or that change call scripts or other interaction programs often. In many situations, the quality and effectiveness of agent training may significantly drive the performance of the call center.

In conventional call centers, training is provided to call center agents through a variety of mechanisms. The supervisor of the call center may simply walk over to individual agents, or place telephone calls to the individual agents, and pass on new information to the agents personally. New information may be distributed by email, by an instructor in a classroom setting, or over an intranet. Alternatively, the information may be broadcast over a public announcement system or may be displayed on a large wall display at the front of the call center. New information may also be provided through a "chair drop" by which written information updates or training materials are handed to the agents for their consumption.

More recently, automated methods for agent training and information updating have been developed. Computer-based training ("CBT") involves the distribution of training programs to an agent's computer desktop, to a dedicated terminal, or to a classroom. CBT may be distributed in a broadcast mode, with each agent receiving the same training at the same time. CBT would be more effectively deployed if it allowed individual agents to access desktop training materials that are tailored to each agent's particular needs and skills shortcomings. In self-directed CBT, each agent takes the initiative to enter a training session and to select appropriate training materials so that the pace and content of the training can reflect individual agent learning rates and base knowledge. Some CBT systems schedule the delivery of training materials to agents at times when call center volume is slow, when the agent needs a break, or at other times. These systems thus enable call center management to integrate call center workload management with agent skills training. An advantageous method and system for scheduling the delivery of training materials to the agent is disclosed in U.S. patent application Ser. No. 09/442,207, filed Nov. 16, 1999, which application is assigned to the assignee of the present application and is hereby incorporated by reference herein.

While computer-based training methods provide a significant improvement in training effectiveness, efficiency, and sophistication to call centers and other constituent contact centers, conventional CBT-based training systems have significant drawbacks. Broadcast CBT systems deliver uniform training to all agents regardless of individual agent skill levels, and those systems do not accommodate the large variations in learning rate or base knowledge that can exist among agents. While self-directed CBT enables agents to learn at their own pace and to select training materials addressing their own skills shortcomings, conventional self-directed training is not amenable to centralized management and control by the call center. For example, conventional self-directed CBT depends on the agent's self-evaluation of his own skill shortcomings. Moreover, conventional CBT systems do not automatically tailor training materials assignment to agents based on an objective evaluation of each agent's skills and performance. In addition, conventional call center training systems are not integrated with call center workforce management, ACD and quality monitoring systems. As a result, call centers employing conventional CBT systems and techniques are unable to tailor training to the needs of individual agents.

SUMMARY OF THE INVENTION

The present invention supports the tailored assignment of training or other information or other tasks to an agent in a call center or other constituent contact environment. Agent interactions with customers or other constituents are recorded over the call center communications network to provide a score of agent performance in each of several skill areas. The call center communications network may be integrated with back-office enterprise resource planning systems or with customer relationship management computer systems. Training materials or other information are assigned to agents based on the agent score in skill areas corresponding to the particular training materials. The assigned training materials are then preferably delivered to the agent over the communications network.

According to one aspect of the invention, agent performance records are accepted from a performance monitoring tool component or quality monitoring component of the call center that produces an agent performance record. The agent performance record is then scored against predetermined performance criteria to produce an agent score.

To match appropriate training to agents in need of training, agent performance categories and remediation thresholds are matched with the training materials themselves. If an agent score in a given performance category is below a predetermined remediation threshold, then a database record is populated, a flag is set, or some other indicator is set to identify the agent's performance shortcoming and the training course associated with that shortcoming. The database may then be polled to determine what training the agent requires.

The invention can include software components for assigning training to an agent based on an assessment of the agent's interactions with its customers or other constituents. A contact agent skills assessment is accepted from a monitoring component that records agent interactions with a customer or other constituent over the communications network and produces the contact agent skill assessment. An assignment component assigns training materials to the agent based on the skills assessment. According to one aspect, a delivery component then delivers the training materials to the agent over the communications network.

The present invention thus advantageously accepts agent performance scores from a monitoring component that records interactions between agents and constituents and scores agent performance against performance criteria. Training materials are assigned to the agents according to each agent's skill in each of the several associated subject matter areas. Individual agent training and overall call center performance are thereby improved.

DETAILED DESCRIPTION OF THE EXEMPLARY EMBODIMENTS

Turning now to the drawings, in which like numerals indicate like elements throughout the several figures, an exemplary embodiment of the invention will now be described in detail. The present invention is directed to the assignment of content, such as training or other materials or other tasks, to a constituent contact agent, such as a call center agent. Although the preferred embodiment of the invention will be described with respect to the assignment of training materials to an agent in a call center, those skilled in the art will recognize that the invention may be utilized in connection with the assignment of a variety of information and tasks in other operating environments.

Figure 1:
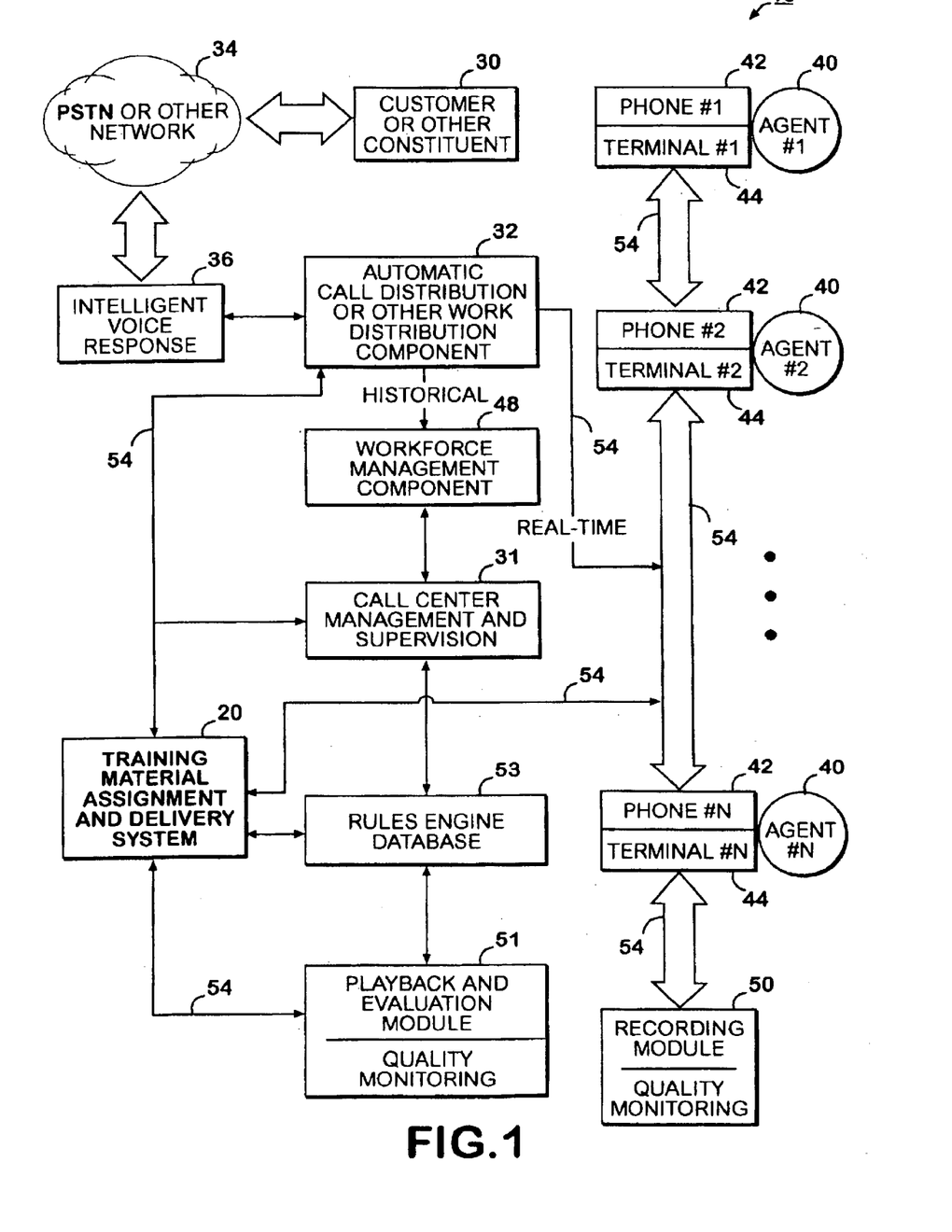
FIG. 1 is a block diagram illustrating a system for managing a computer-based customer call center system in accordance with an exemplary embodiment of the present invention.

FIG. 1 illustrates a computer system for managing a call center in which one advantageous embodiment of the present invention is implemented. A call center 10 includes a training system 20 operative to assign and deliver training material to call center agents 40. In a typical application of the call center 10, a customer 30 calls via the public switched telephone network ("PSTN") or other network to the call center 10. The customer call may be initiated in order to sign up for long distance service, inquire about a credit card bill, or purchase a catalog item, for example. Through the PSTN 34, the call from the customer 30 reaches an Automatic Call Distribution ("ACD") component 32 of the call center. The ACD component functions to distribute calls from customers to each of a number of call center agents 40 who have been assigned to answer customer calls, take orders from customers, or perform other interaction duties. Agents are typically equipped with a phone 42 and a call center computer terminal 44 for accessing product information, customer information, or other information through a database. For example, in a call center implemented to support a catalog-based clothing merchant, the terminal 44 for an agent could display information regarding a specific item of clothing when a customer 30 expresses an interest in purchasing that item.

Customer phone calls and relevant database information are integrally managed by modem call centers 10 through what is known as computer/telephone integration ("CTI"). A CTI function within ACD component 32 enables the call center 10 to extract information from the phone call itself and to integrate that information with database information. For example, the calling phone number of a customer 30 may be used in order to extract information regarding that customer stored in the call center database and to deliver that customer information to an agent 40 for the agent's use in interacting with the customer. A CTI function within ACD component 32 may also interact with Intelligent Voice Response ("IVR") unit 36, for example to provide a touch-tone menu of options to a caller for directing the call to an appropriate agent.

A typical call center 10 includes a Workforce Management ("WFM") component 48. The WFM component 48 is used to manage the staffing level of agents 40 in the call center 10 so that call center productivity can be optimized. For example, the volume of calls into or out of a call center 10 may vary significantly during the day, during the week, or during the month. WFM component 48 preferably receives historical call volume data from ACD component 32 and provides information regarding the call center agent work force to call center management 31.

Through the use of WFM component 48, the call center management 31 can determine an appropriate level of staffing of agents 40 so that call hold times are minimized, on the one hand, and so that agent overstaffing is avoided, on the other hand. Call center management 31 can also use information from WFM component 48 to staff the call center with agents having particular skills at a particular time. For example, if the mix of callers providing customer complaints and callers placing new orders varies significantly during the day, call center management 31 may staff different shifts of call center agents with a different mix of skills to reflect that variation in call content.

In a typical call center, customer calls and interactions between customers and agents 40 are selectively sampled as part of a quality control program within the call center 10. This function is typically performed through quality monitoring recording and evaluation components 50 and 51, respectively, within a quality monitoring system in the call center 10.

Quality monitoring recording component 50 records interactions between the customer 30 and the agent 40 through the agent's phone 42 and records the information delivered through the system to the agent's terminal 44 and the information the agent provides via the terminal 44 during the interaction. The verb "record" is used throughout this document to refer to both occasional monitoring of agent interactions as well as constant monitoring of agent interactions. Each call and the system information delivered in support of the call are typically recorded for subsequent evaluation of agent skills by call center management 31.

The training system 20 preferably accepts scores from the quality monitoring evaluation component 51, which enables call center management 31 to review recorded agent/customer interactions and to evaluate agent performance during those interactions. For example, call center management can assess the level of skill of an agent in each of several skill areas. As an example, the relevant skill areas for a call center serving a catalog clothing merchant could include product configuration knowledge (e.g. color options), knowledge of shipping and payment options, knowledge of competitor differentiation, and handling an irate customer. Quality monitoring evaluation component 51 provides data to the training system 20 and gives call center management the ability to evaluate an agent's level of skill in each of several areas. Those areas in which an agent's skill are determined to be below predetermined performance thresholds are identified along with course assignments so that the training system 20 can provide training materials to the agent that correspond to the agent's skill shortcomings.

Call center 10 also preferably includes a database 53 for storing data relating to the identified skills shortcomings and course assignments of each agent. Records in the database 53 preferably include an identification of the agent and the skill type found lacking in the agent along with the course assigned to the agent.

The call center 10 includes a communications network 54 to interconnect and link the aforementioned components. For a call center in which all elements are located at the same site, a local area network may provide the backbone for the call center communications network 54. In call centers for which the elements are geographically dispersed, the communications network may comprise a wide area network, a virtual private network, a satellite communications network, or other communications network elements as are known in the art.

The training system 20 according to one advantageous embodiment of the present invention is implemented in software and is installed in or associated with the call center computer system 10. Under the control of call center management 31, the training system 20 can assign training material to agents 40 and deliver those training materials via communications network 54 to the agent. Integration with the WFM component 48 and the ACD 32 enables the training system 20 to deliver the training materials to agents at times when those agents are available and when training will not adversely impact call center performance.

The training system 20 is also in communication with quality monitoring components 50, 51 through the communications network 54 so that appropriate training materials may be delivered to agents who are most in need of training. Proficient agents are thus spared the distraction of unneeded training, and training can be concentrated on those agents most in need and on areas of greatest need for those agents. Advantageously, call center management 31 may establish pass/fail or remediation thresholds to enable the assignment of appropriate training to appropriate agents. This functionality may be provided within the quality monitoring evaluation module 51. Preferably, agent skills that are found to be deficient relative to the thresholds are flagged and stored in the database 53 or otherwise flagged.

In another advantageous embodiment of the present invention, the training system 20 may be deployed on a stand-alone server located remotely from call center 10. For example, training system 20 could be deployed to serve a number of independent call centers 10, such as in a "web services" or application service provider business model. In such a remote deployment, the problems of integration with individual call center computer systems can be avoided and the training system 20 can be maintained at a single central location.

A wide range of agent training scenarios can be supported by the training system 20. The training materials that are appropriate for a particular call center application can vary widely according to the call center function. The subject matter of training materials may also vary widely; for example, training materials may be focused on product information, phone etiquette, problem resolution, or other subjects.

Figure 2:
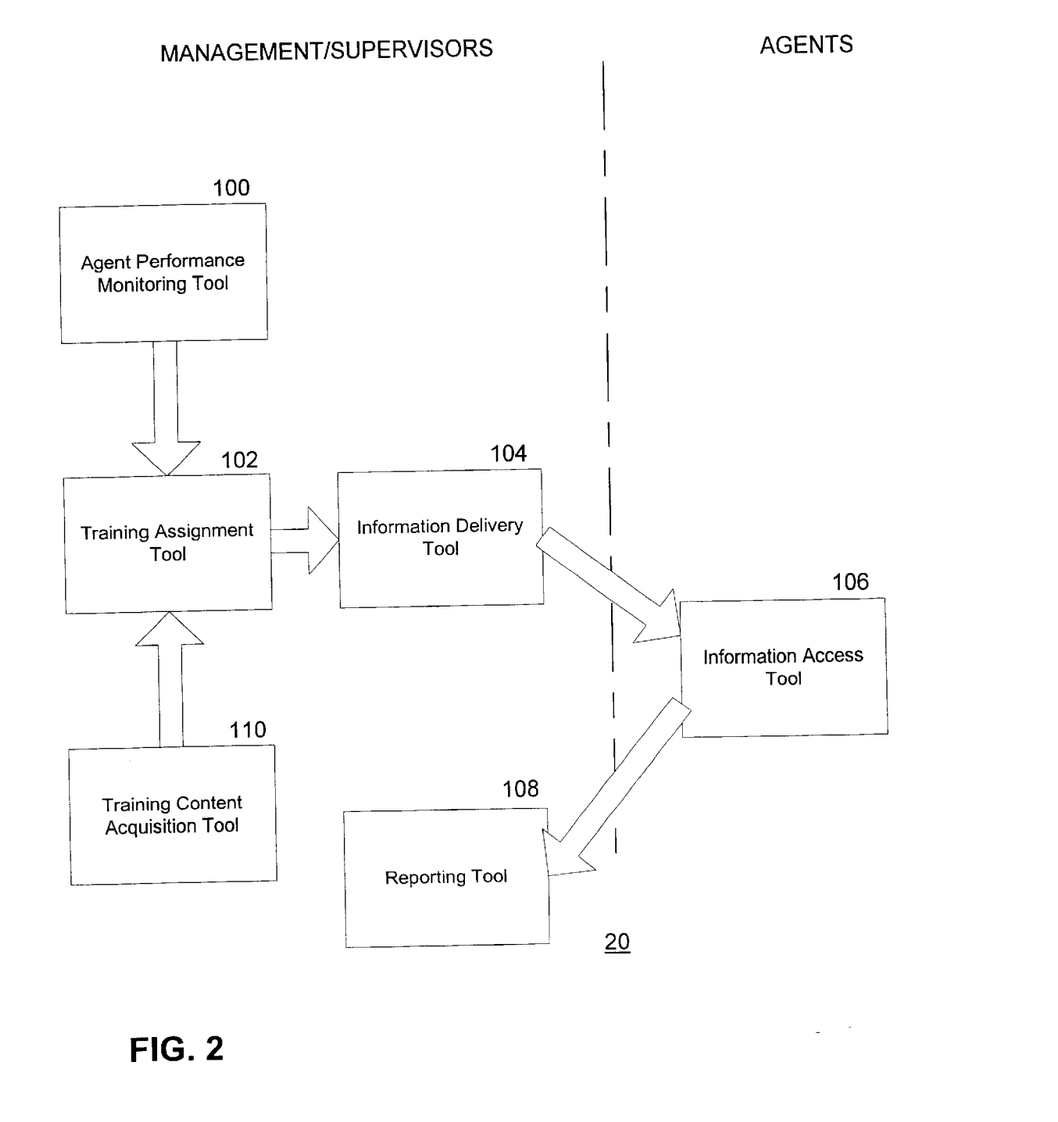
FIG. 2 is a block diagram illustrating a system for the assignment of training materials in accordance with an exemplary embodiment of the present invention.

FIG. 2 is a block diagram illustrating a training system 20 for evaluating agent skill levels and assigning and delivering training materials to call center agents in a call center 10. The training system includes a number of interoperable software modules. Performance monitoring tool 100 is a software module that enables the managers of a call center to accept data from a quality monitoring component 51 that records agent/customer interactions and evaluates and scores agent performance. Performance monitoring tool 100 also stores agent performance scores and course assignments in a database.

Training system 20 preferably further includes a training assignment tool 102 that enables call center managers to compare agent performance scores stored in the quality monitoring evaluation tool against predetermined remediation thresholds or other performance thresholds, and copies agent deficiencies data and relevant courses into a database that is accessible by the training system 20.

The training system 20 preferably further includes an information delivery tool 104 that delivers assigned training to the appropriate agent over the communications network 54. The information delivery tool 104 preferably receives agent workload data and call center load data from ACD 32 and agent schedule data from WFM 48 so that training materials may be delivered at times when agents are best able to receive and consume those materials. The training system further comprises information access tool 106 for receiving the training materials by the agents over communications network 54.

Agent consumption of training is preferably tracked by the reporting tool 108, which is preferably adapted to generate standard and custom reports to enable call center managers and supervisors to more effectively manage agent performance and agent training programs. A training content acquisition tool 110 is also preferably included to manage the creation or acquisition of training content. Training content may be created by call center employees internally or may be acquired from outside sources of training content. Training content acquisition tool 110 enters the training content into training system 20 so that the content can be accessed by the training system 20 to train agents. The training content acquisition tool 110 provides training titles to the training assignment tool 102 for assigning to agents having skills that are deficient in the identified subject.

Figure 3A:
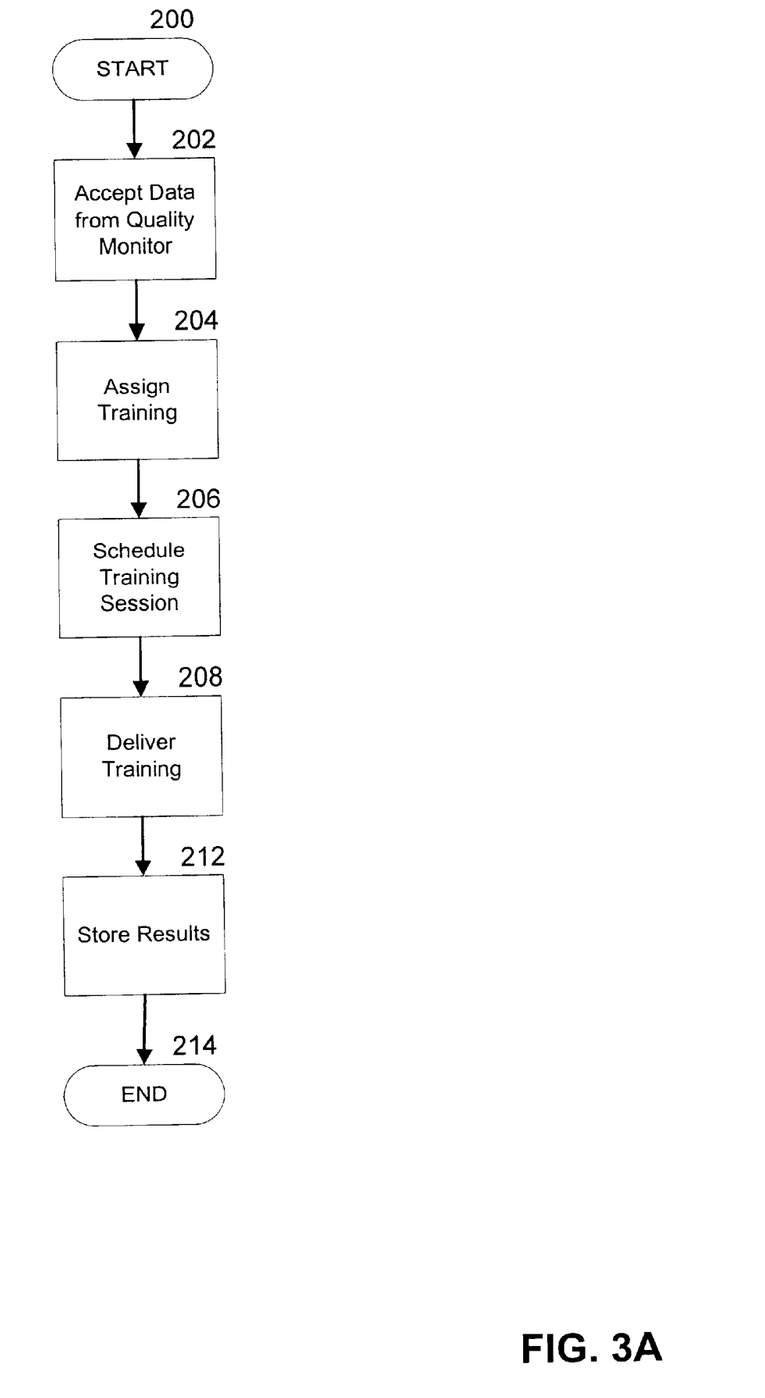
FIGS. 3A, B, C are flow charts indicating the steps in a method for training a contact agent to perform constituent contact duties in accordance with an exemplary embodiment of the present invention.

Turning now to FIGS. 1, 2, and 3A, the steps in a method for assigning training to a contact agent within a call center operating environment according to one advantageous embodiment of the present invention are illustrated in flow chart form in FIG. 3A. The method begins at step 200. At step 202, data reflecting the performance of an agent 40 in interacting with customers 30 is accepted from a quality monitoring recording module 50. As will be described in more detail in connection with FIG. 3B, step 202 is performed by training assignment tool 102. The agent performance data may be in many forms, but in one example, for a catalog clothing merchant call center application, the data includes agent customer service skills categorized by subject matter areas such as competitor knowledge, return policy knowledge, and product care knowledge.

Once the appropriate training has been assigned to an agent by training assignment tool 102 in step 204, a training session for the agent is preferably scheduled according to step 206. The scheduling step preferably includes the training system 20 obtaining real time and historical information from the automatic call distribution 32 and workforce management 48 to determine when an agent should be or is available for training and is not otherwise occupied with customer contact responsibilities. An advantageous method and system for scheduling the delivery of training materials to the agent is disclosed in U.S. patent application Ser. No. 09/442,207, filed Nov. 16, 1999, which application is assigned to the assignee of the present application and is hereby incorporated by reference herein.

The method then proceeds to step 208, at which step the assigned training material or other task is delivered to the appropriate agent over the communications network 54 by the training system 20 through information delivery tool 104. At step 208, the information delivery tool 104 provides training materials to the agent through information access tool 106. In this exemplary method, the training materials delivered can, for example, comprise a sequenced series of training segments, each of limited duration, that together form an integrated whole. Of course, the training materials delivered can vary considerably from call center to call center as dictated by the function of the call center and the business supported by the call center, and training materials are preferably delivered to the agent through agent terminal 44 over communications network 54. Call center management 31 preferably can modify or terminate a training session as real time requirements of the call center dictate, such as when incoming call volume increases. For example, the training materials may include a quiz or test of recently learned subject matter.

The method then proceeds to step 212, at which step the results of agent training activity are stored by reporting tool 108 from information provided by information access tool 106. The information stored during step 212 may include, for example, information regarding the length of a particular training session, data on the agent's score on a quiz associated with the training materials, or other information. Preferably, call center management 31 uses the training data to modify or enhance training materials as appropriate. The method then terminates at step 214.

Accordingly, the method according to one exemplary embodiment as illustrated in the flow diagram of FIG. 3A accepts agent skill shortcomings and course assignments from quality monitoring modules 50, 51 and delivers appropriate training materials to agents who require training to agent terminal 44 through communications network 54. Training content can therefore be advantageously delivered to agents in accordance with their skill levels and needs for training.

Figure 3B:
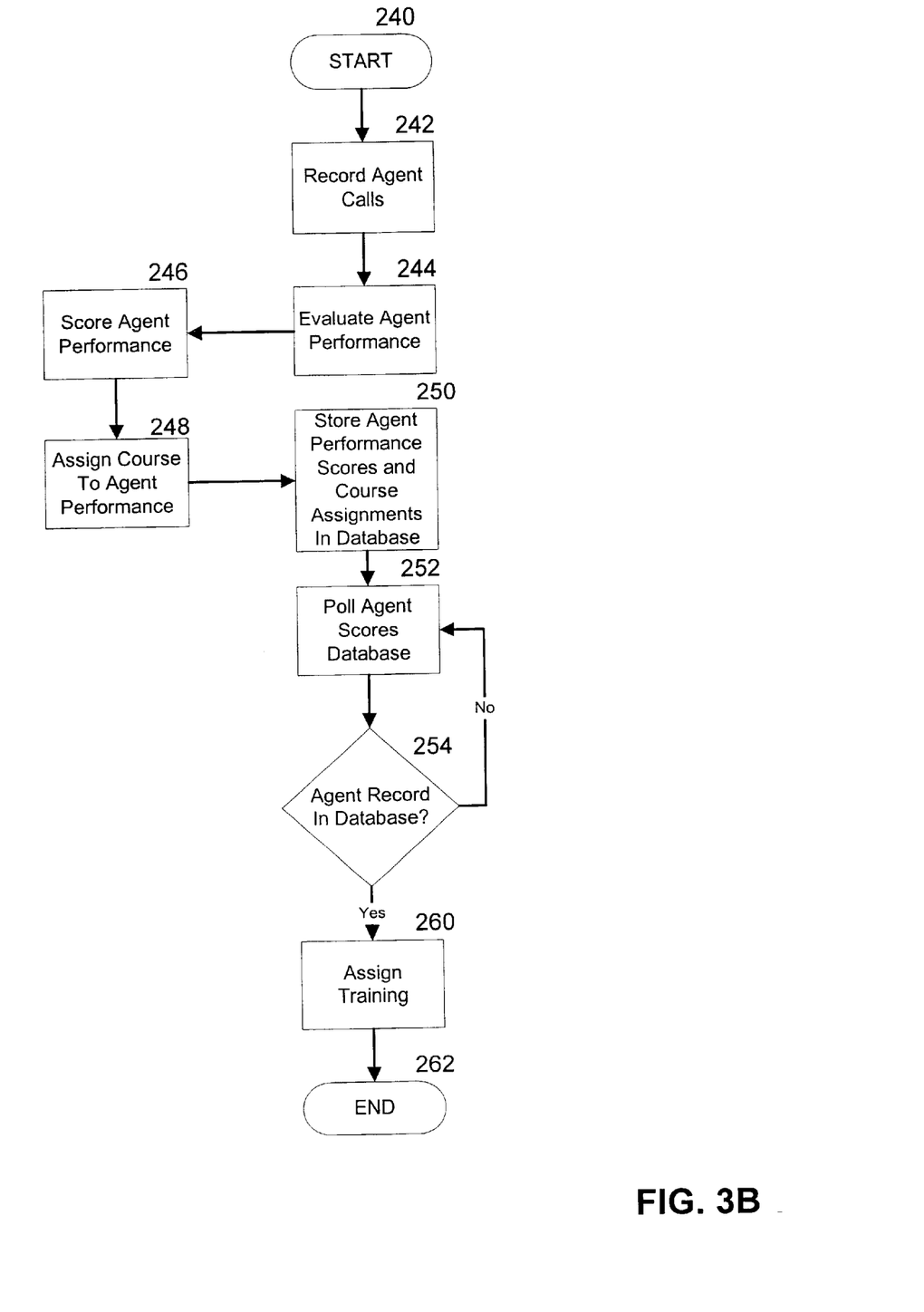

Referring now to FIGS. 1, 2, and 3B, the steps in a method for recording agent performance and identifying agent training deficiencies as performed by performance monitoring tool 100 are illustrated in the flow diagram of FIG. 3B. According to this exemplary method, which starts at step 240, agent interactions with customers 30 are recorded over communications network 54, in recording module 50, including voice interactions and data interactions, in step 242. An agent performance record is thereby created by recording module 50. In step 244, the agent performance record is evaluated by quality monitoring evaluation module 51 in accordance with criteria provided by call center management 31. In step 246, the agent performance records are scored by call center management 31 using quality monitoring evaluation module 51 to yield an indication of which skill areas a particular agent is deficient in. In step 248, courses or other information associated with the skill are assigned to each agent performance record by call center management. For example, a performance record comprising a customer call to inquire about store return policies may be categorized by a skill code that identifies the record as being associated with return policy knowledge.

In step 250, the evaluation module preferably stores each of the agent performance scores and course assignments in a database within the quality monitoring evaluation module 51. The method then proceeds to step 252, where database 53 periodically polls the evaluation module 51 for agent performance scores. At step 254, if an agent record is found in the database, then the method proceeds through the "Yes" branch to step 260. If an agent record is not found, then the method returns through the "no" branch to step 252. The training system 20 then assigns training at step 260, and the method ends at step 262.

In summary, then, the performance monitoring tool 100 accepts data reflecting agent interactions with customers from a quality monitoring module to determine skill areas in which the agent's skill is deficient, assigns a code to the identified performance records, compares the coded performance scores with predetermined performance thresholds assigned by call center management, and thereby identifies the subject matter for which a particular agent's skills are deficient.

Figure 3C:
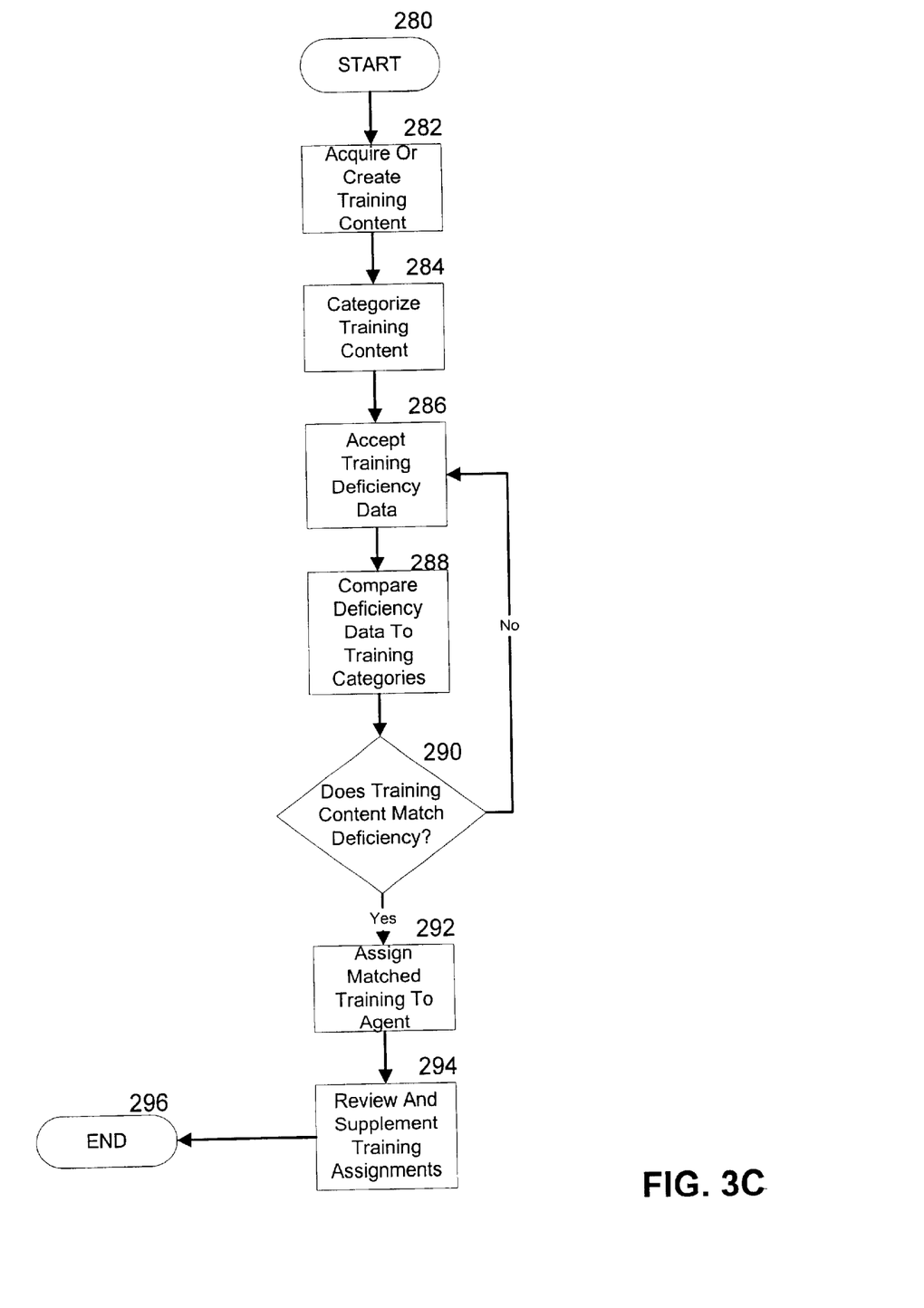

Training assignment tool 102 and training content acquisition tool 110 within training system 20 perform the steps in a method for assigning training materials to agent as illustrated in the flow diagram of FIG. 3C. Referring now to FIGS. 1, 2, and 3C, the method starts at step 280. At step 282, training materials are acquired or created by call center management 31 using training content acquisition tool 110. For example, call center management may produce its own multimedia training materials, or such materials may instead be procured from outside vendors. In any case, the training materials are captured by the training system 20 with training content acquisition tool 110.

At step 284, the training system 20 categorizes each of the training materials corresponding to the agent skill with which it is associated. At step 286, the training system 20 accepts agent skills deficiency scores from the database 53. At step 288, the training system 20 compares the coded deficient agent scores with the categories of training materials that are available. If the available training material matches the deficiency indicated by the code of the agent score, the method proceeds through the "Yes" branch to step 292. If there is no match between the agent score deficiency indication and the training materials, the method proceeds through the "No" branch back to step 286.

At step 292, the training system 20 assigns the matched training materials to a particular agent for delivery over the communications network 54. The method then proceeds to step 294, at which step the call center management 31 has an opportunity to review and supplement the training materials or modify the assignment of training materials to agents as necessary. The method then terminates at step 296.

Accordingly, the training assignment tool 102 accepts acquired or created training materials and compares that training material to agent skills performance information to assign appropriate training materials to agents in need. Agent training is thus optimized in the call center while avoiding unnecessary agent distraction.

Figure 4:
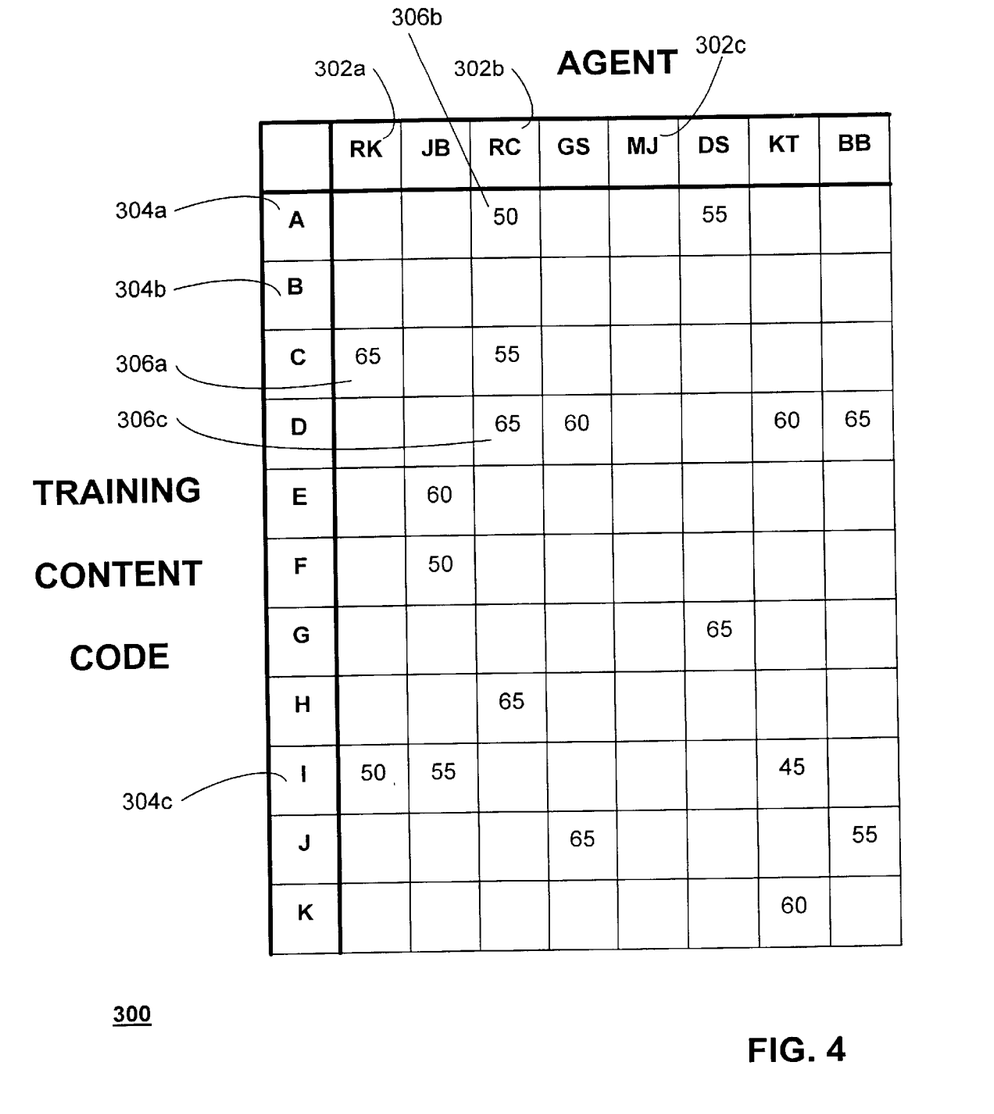
FIG. 4 is a table illustrating the structure and contents of a training database record in a system for the assignment of training materials in accordance with an exemplary embodiment of the present invention.

An example of a data record 300 stored in database 53 according to one embodiment of the invention is illustrated in FIG. 4. Referring to FIGS. 1 and 4, agent score data record 300 comprises a two dimensional record of agent scores ordered by agent identity and the skill deficiency to which the performance score correlates. As shown in FIG. 4, agent identity 302 may include agent initials RK, RC, or MJ. On the vertical axis, training content categories 304 include categories A, B, and I. In the example shown, a predetermined remediation threshold score of 70 is assumed, and the table includes in the database 53 only those records of agent scores below the predetermined remediation threshold of 70. For example, agent score 306a indicates that agent RK scored 65 on a skills evaluation corresponding to training content category C and a score of 50 on a skill corresponding to training content category I. Likewise, agent RC scored 50 on a skill corresponding to training content category A, 55 on a skill corresponding to training content category C, 65 on a skill corresponding to training content category D, and 65 on a skill corresponding to training content category H. On the other hand, agent MJ has no entries in the data record 300, indicating that agent MJ has not failed any of the tests administered to that agent. Other data structures for data record 300 indicating which agents are deficient in which skill areas are contemplated by the present invention as are known to those skilled in the art.

It should be emphasized that the illustration of a call center environment in the preceding discussion is an example of one common application that can take advantage of the present invention, but that the present invention is not limited to call centers, to the delivery of training materials, or to the performance of other tasks. The methods provided by the present invention can be applied in any constituent contact environment and may include a variety of media through which contact with constituents may be made by the constituent contact system. For example, constituents may include, in addition to customers, the employees of an organization, sales representatives of an organization, suppliers of an organization, contractors of an organization, or other constituents.

Moreover, according to the present invention, the medium of communication between the system and the constituents may include voice contact over the public switched telephone network, e-mail communications provided through the Internet, Internet-based "chat" contact, video communications provided over the Internet or over private broadband networks, or other communications media and forms as are known in the art.

In addition, the methods provided by the present invention include the delivery of a broad range of information to constituent contact agents. In addition to the training materials described above by way of example, any sort of information amenable to distribution via a digital communications network may be delivered in accordance with the present invention. For example, news information, real-time video, sporting event information, music, conference call voice and video information, or other text, audio, video, graphics, or other information may be delivered without departing from the invention.

According to another aspect of the invention, a computer readable medium having computer executable instructions is provided that includes software components adapted to perform steps corresponding to the steps in the methods described above. According to one advantageous embodiment, a performance component is provided that accepts an agent score from a quality monitoring component, the agent score indicating contact agent performance, and produces a contact agent skills assessment from the agent score. An assignment component is also provided that assigns training to the agent based on the assessment of agent skills. Advantageously, a training content component is also provided to accept training materials created by the call center itself or by outside content creators. By coding the agent skills assessment according to the associated subject matter and categorizing the training materials, agent skills shortcomings may be matched to appropriate training materials.

In summary, the present invention can accept data from a quality monitoring component and assess agent performance and assign tailored training materials or other information to agents in a call center or other constituent contact system. Training materials may be directed to agents in need of training and may be tailored to those areas in which training is most needed. The training materials may be created internally by call center management or may be acquired from outside training content vendors. By categorizing the training materials and coding the agent performance scores according to the skill associated with the materials or performance, appropriate training materials may be tailored to each agent. Call center management may modify training materials or assignments before delivery of the materials to the agent. Delivery of the materials may be scheduled to avoid disrupting the agent's duties within the call center.

From the foregoing, it will be appreciated that the preferred embodiment of the present invention overcomes the limitations of the prior art described herein. From the description of the preferred embodiment, equivalents of the elements shown therein will suggest themselves to those skilled in the art, and ways of constructing other embodiments of the present invention will suggest themselves to practitioners of the art. Therefore, the scope of the present invention is to be limited only by the claims below.

What is claimed is:

1. A method for providing information to a contact agent in a constituent contact system comprising the steps of:

receiving evaluation data indicating a deficient interaction skill for an interaction between the contact agent and a constituent;

associating the deficient interaction skill with a category of information; and assigning information from the category of information to the contact agent without manual intervention.

2. The method of claim 1 further comprising the step of delivering the information to the contact agent using the constituent contact system.

3. The method of claim 2 further comprising the step of conducting a follow-up evaluation after delivering the information to the contact agent.

4. The method of claim 1 further comprising the step of delivering the information to the contact agent in segments.

5. The method of claim 1 further comprising the step of delivering the information to the contact agent when it does not interfere with the workload of the constituent contact system.

6. A computer-readable medium having computer-executable instructions for performing the steps recited in claim 1.

7. A method for providing information to a contact agent in a constituent contact system comprising the steps of:

receiving evaluation data indicating a deficient skill for the contact agent, wherein the evaluation data is derived from an interaction between a contact agent and a customer;

associating the deficient skill with a category of information;

selecting information from the category of information; and assigning the selected information to the contact agent.

8. The method of claim 7 further comprising the step of delivering the selected information to the contact agent using the constituent contact system.

9. The method of claim 8 further comprising the step of conducting a follow-up evaluation after delivering the selected information to the contact agent.

10. The method of claim 7 wherein the step of selecting information is performed by the contact agent.

11. The method of claim 7 wherein the step of selecting information is performed by an administrator.

12. The method of claim 7 further comprising the step of delivering the selected information to the contact agent when it does not interfere with the workload of the constituent contact system.

13. A computer-readable medium having computer-executable instructions for performing the steps recited in claim 7.

14. A computer-implemented system for managing communications between an organization and its constituents, the system comprising:

a communications network that supports communication between one of the constituents and an agent of the organization;

a monitoring component adapted to produce evaluation data from a monitored communication between the agent and the constituent, the evaluation data indicating a deficient skill for an agent; and an assignment component adapted to
associate the deficient skill with a category of information; and
assign information from the category of information to the agent.

15. The system of claim 14 further comprising a delivery component adapted to deliver the assigned information to the agent.

16. The system of claim 14 wherein the monitoring component is further adapted to perform a follow-up evaluation after delivery of the assigned information.

17. The system of claim 14 wherein the assignment component is further adapted to support selection of information from the category of information.

18. A method for training a representative of an organization comprising the steps of:

receiving an evaluation of the representative;

mapping the evaluation to a skill without manual intervention;

comparing the evaluation to a predetermined threshold; and if the evaluation is below the predetermined threshold, associating the skill of the evaluation with training material related to the skill; and assigning the training material to the representative.

19. The method of claim 18, further comprising the step of delivering the training material to the representative.

20. The method of claim 18, further comprising the step of performing a follow-up evaluation to determine the effectiveness of the training material.

21. A computer-readable medium having computer-executable instructions for performing the steps recited in claim 18.

22. In association with a computer system for managing a constituent contact system, a method for training a contact agent to perform interaction duties, the method comprising the steps of:

monitoring an interaction between the contact agent and a constituent of the constituent contact system;

scoring the performance of the contact agent during the monitored interaction; and assigning training to the contact agent, without manual intervention, based on the scoring of the performance of the contact agent.

23. The method of claim 22, further comprising the step of delivering the assigned training by providing training content to the contact agent, said training content directed to an aspect of constituent interaction in which the contact agent requires performance improvement.

24. The method of claim 23, further comprising the step of recording the delivery of the assigned training with a reporting tool.

25. The method of claim 24, further comprising the step of using the reporting tool to track training previously delivered to the contact agent and assign additional training to the contact agent.

26. The method of claim 22, further comprising the steps of retrieving training content for the assigned training from a training content acquisition tool; and delivering the training content to the contact agent.

27. The method of claim 26, further comprising the steps of creating the training content to improve the contact agent's performance;

storing the training content with the training content acquisition tool; and indexing the training content for use in assigning training to the contact agent.

28. The method of claim 22, further comprising the step of delivering the assigned training to the contact agent during a time period that does not interfere with the contact agent's interaction with constituents of the constituent contact system.

29. The method of claim 22, wherein the step of assigning training comprises
assigning the contact agent's score to a category associated with an interaction performance skill; and
matching the assigned training to training content for the category.

30. The method of claim 22, wherein the step of assigning training comprises:
coding the contact agent's score to identify subject matter associated with the agent performance score;
coding training materials to identify subject matter associated with the assigned training;
comparing the contact agent's score to a predetermined threshold; and
if the contact agent's score is below the predetermined threshold, associating the coding of the contact agent's score with the coding of the training materials.

31. A computer-readable medium having computer-executable instructions for performing the steps recited in claim 22.

32. A method for training an agent to perform interaction duties, the method comprising the steps of:
recording an interaction between the agent and a constituent to produce an agent performance record;
categorizing the agent performance record according to a skill associated with the agent performance record;
categorizing training content according to subject matter associated with the training content;
comparing the agent performance record to a criterion;
if the agent performance record does not satisfy the criterion, matching the categorized agent performance record and the categorized training content; and
assigning the training content to the agent based on the matching of the categorized agent performance record and the categorized training content.

33. The method of claim 32, further comprising the steps of
retrieving the assigned training content from a training content acquisition tool; and
delivering the assigned training content to the agent.

34. The method of claim 32, further comprising the step of recording the delivery of the assigned training content with a reporting tool.

35. The method of claim 34, further comprising the step of using the reporting tool to track training previously delivered to the contact agent and assign additional training to the contact agent.

36. The method of claim 32, further comprising the steps of
storing the agent performance record;
storing the training content assignment; and
delivering the training content assignment to the agent.

37. A computer-readable medium having computer-executable instructions for performing the steps recited in claim 32.

38. A method for training a representative to conduct communications activities, the method comprising:
monitoring a live communication activity involving the representative and a another party;
assigning a score to the representative based on the monitored communication;
determining whether the score meets a predetermined threshold;
if the score does not meet the predetermined threshold,
coding the score assigned to the representative according to subject matter associated with the score;
coding information according to subject matter associated with the information;
associating the coding of the score with the coding of the information; and
assigning the information to the agent based on the association of the coding of the score with the coding of the information.

39. The method of claim 38, further comprising the steps of
retrieving the assigned information from a training content acquisition tool; and
delivering the assigned information to the representative.

40. The method of claim 38, further comprising the step of delivering the assigned information to the representative during a time period that does not interfere with the communication activity of the agent.

41. The method of claim 38, further comprising the steps of
storing the representative's score;
storing the information assignment; and
delivering the assigned information.

42. A computer-readable medium having computer-executable instructions for performing the steps recited in claim 38.

43. A system for managing communications between an organization and its constituents, the system comprising:
a communications network that supports communication between one of the constituents and a representative of the organization;
a monitoring component adapted to
produce an evaluation of the representative from a monitored communication between the representative and the constituent; and
map the evaluation to a skill;
an assignment component adapted to
compare the evaluation to a predetermined threshold, and
if the evaluation does not meet the predetermined threshold,
match the mapped evaluation skill to a training material and assign the training material to the representative to address an issue identified by the evaluation.

44. The system of claim 43, wherein the assignment component is further adapted to
generate a measure of the correlation between the mapped evaluation skill and the training material, and
assign the training material to the representative based on the correlation measure.

45. The system of claim 43, further comprising a delivery component adapted to deliver the training material to the representative.

46. The system of claim 45, wherein the delivery component is further adapted to deliver the training material in discrete segments.

47. The system of claim 43, further comprising a training content component adapted to code the training material according to a skill associated with the training material.

48. The system of claim 43, wherein the monitoring component is further adapted to produce a follow-up evaluation.

49. A method for training a customer service agent to perform interaction duties, the method comprising the steps of:
recording a live communication between the customer service agent and a customer to produce a performance record;

evaluating the communication by comparing the performance record to a performance threshold;

if the performance record does not satisfy the performance threshold, then identifying training content that addresses a performance issue raised by the performance record; and assigning the identified training content to the agent.

50. The method of claim 49, further comprising the steps of retrieving the assigned training content from a training content acquisition tool; and delivering the assigned training content to the agent.

51. The method of claim 50, further comprising the step of recording the delivery of the assigned training content with a reporting tool.

52. The method of claim 49, further comprising the steps of storing the agent performance record;

storing the training content assignment; and delivering the training content assignment to the agent.

53. A computer-readable medium having computer-executable instructions for performing the steps recited in claim 49.

* * * * *

UNITED STATES PATENT AND TRADEMARK OFFICE
CERTIFICATE OF CORRECTION

| | | |
|---|---|---|
| PATENT NO. | : 6,775,377 B2 | Page 1 of 1 |
| DATED | : August 10, 2004 | |
| INVENTOR(S) | : John C. C. McIlwaine and Matthew G. A. McConnell | |

It is certified that error appears in the above-identified patent and that said Letters Patent is hereby corrected as shown below:

<u>Title page,</u>
Item [75], Inventors, should read as follows:
-- (75) Inventors: John C. C. McIlwaine, Alpharetta, GA (US); Matthew G. A. McConnell, Duluth, GA (US) --

Signed and Sealed this

Nineteenth Day of October, 2004

JON W. DUDAS
*Director of the United States Patent and Trademark Office*